United States Patent [19]

Miles et al.

[11] 4,070,542

[45] Jan. 24, 1978

[54] PRODUCTION OF BETA-ALUMINA CERAMIC ARTICLES AND FURNACE THEREFOR

[75] Inventors: Lyndon James Miles; Ivor Wynn Jones, both of Chester, England

[73] Assignee: The Electricity Council, London, England

[21] Appl. No.: 615,866

[22] Filed: Sept. 22, 1975

Related U.S. Application Data

[63] Continuation-in-part of Ser. No. 450,111, March 11, 1974, abandoned.

[30] Foreign Application Priority Data

Mar. 12, 1973 United Kingdom ............ 11835/73

[51] Int. Cl.$^2$ .................................... H05B 5/00
[52] U.S. Cl. ............................. 13/26; 219/10.49 R; 264/65
[58] Field of Search ............ 13/26, 27, DIG. 1; 219/10.49, 10.41, 10.43; 264/65

[56] References Cited

U.S. PATENT DOCUMENTS 3,226,465  12/1965  Downing et al. ............ 219/10.49 X

OTHER PUBLICATIONS

"Production of β-Al$_2$O$_3$ Electrolyte"; Proceedings of British Ceramics Society, No. 19, 1971, pp. 161–178.

Primary Examiner—R. N. Envall, Jr.
Attorney, Agent, or Firm—Beveridge, DeGrandi, Kline & Lunsford

[57] ABSTRACT

In making β-alumina ceramic articles by a fast firing technique in which the green shapes of compressed powder material are sintered by passing them continuously through a tubular furnace, the furnace is sloped upwardly to give convective air flow forwardly through the furnace at a speed not less than the speed of movement of the article or other means are provided for causing such an air flow or flow of other oxygen-containing gas. An induction furnace is described having a rotating tube and automatic temperature control means.

15 Claims, 4 Drawing Figures

PRODUCTION OF BETA-ALUMINA CERAMIC ARTICLES AND FURNACE THEREFOR

CROSS REFERENCES TO RELATED APPLICATIONS

This application is a continuation-in-part of our Application Ser. No. 450111 filed Mar. 11, 1974 now abandoned.

BACKGROUND OF THE INVENTION

1. Field of the Invention.

This invention relates to the continuous production of β-alumina ceramic articles by a sintering process in which compressed powder material is traversed through a furnace.

β-Alumina ceramic is a material having a nominal composition by weight of 5% $Na_2O$, 95% $Al_2O_3$. The amount of sodium oxide in practice can range from 5 up to 10%. It may also contain oxides of magnesium and/or lithium. The material can be sintered in the temperature range 1550° to 1900° C. It is used in sodium sulphur cells and other electrochemical devices requiring passage of sodium ions. Desirable properties for this material in such applications include high density, imperviousness to helium gas and close control of composition and properties throughout the bulk and particularly right up to the surface of the material. The material may typically be required in the form of long thin wall tubes with or without a closed end or in the form of discs.

2. Prior Art.

As is described in British Patent Specification No. 1297373, articles of β-alumina ceramic may be produced using a fast firing technique by forming shapes of compressed powder of the required composition and moving these shapes through a tubular furnace so that a short length of the material is raised to the sintering temperature, the movement being continuous so that the heated zone is gradually moved along the length of the material to be fired. The compressed powder may be pre-dried powdered β-alumina ceramic or a pre-dried powdered mixture of materials which, on heating, produce β-alumina ceramic.

At the firing temperature, the volatile component ($Na_2O$) vaporises, leading to variability of composition and ceramic properties in the article. In conventional firing, loss of soda may be prevented by buffering, i.e. by surrounding the ceramic with a loose powder of the same composition. However due to temperature gradients within the furnace causing variations in the vapour pressure of the soda, the fired ceramic may still have properties which vary between different parts of the article.

SUMMARY OF THE INVENTION

It is an object of the present invention to provide an improved method of continuously producing articles of β-alumina ceramic material which overcomes these difficulties.

According to one aspect of the present invention, a method of compressing pre-dried powdered β-alumina ceramic or a pre-dried powdered mixture of materials which on heating produce a β-alumina ceramic into shapes, each shape being in the form of the required article then moving compressed powdered material continuously through a tubular furnace in the direction of the longitudinal axis thereof and simultaneously causing a flow of air or other oxygen-containing gas through the tubular furnace in the direction of movement of the material at a speed equal to or greater than the speed of movement of the material. In practice the speed of movement of the material is very slow (for example 50 mm per minute) so that any induced or forced gas flow in practice will be faster than this and, in the following description, unless specifically stated otherwise, it is to be understood that any reference to the flow of gas through the furnace means a flow faster than the speed of the material.

Preferably, the movement of the shape or set of shapes through the furnace is such that a short length of material is raised to the sintering temperature with the heated zone gradually moving along the length of material to be fired.

With the method described above, a very short heating and sintering time can be employed as described in the aforementioned Specification No. 1297373. By choice of the length of furnace, rate of traverse and firing temperature, close control of grain size can be obtained as described in that specification. With the method of the present invention, as the unfired material is heated on entering the furnace it gives off water vapour and a small amount of sodium oxide vapour. The water vapour is carried forward through the furnace by the prescribed gas flow. The water vapour cannot recondense on the articles entering the firing zone and thereby accumulate in the furnace to reach critical concentration on the unfired material. By the evaporation of the small amount of sodium oxide from the incoming articles, a stable sodium oxide-rich atmosphere is produced and maintained in the firing zone. This is in contrast to the conditions which would occur, for example, if the gas flow was in the opposite direction to the movement of the article. In that case, the water vapour would recondense on the cold incoming material. The water concentration would tend to build up towards a critical value and cause the incoming tubes to break up in the furnace. The conditions in the sintering zone are non-equilibrium and the properties of the ceramic material will deteriorate as the article or run of successive articles proceeds through the furnace.

With the method of the present invention, the flow must be sufficient to carry the water vapour through the furnace but not so great that the sodium oxide is carried away from the firing zone faster than it can be replaced.

The gas flow, which would usually be air together with the aforementioned water and sodium oxide vapour, may be a forced flow but most conveniently it is a convective flow, the furnace being sloped upwardly in the direction of movement of the article to induce the convective flow. The rate of flow will depend not only on the slope of the tube but also on the temperature, the size of the articles in the furnace and the dimensions of the furnace components. In practice however it is readily possible to determine empirically the optimum slope of a furnace for articles of a given size and for given firing conditions. The slope typically is of the order of a few degrees.

The invention further includes within its scope a furnace for the production of β-alumina ceramic articles comprising an open-ended tube with heating means, e.g. an induction coil around the tube, and means for moving the articles continuously through the tube at a uniform rate and either having means for forcing air to flow through the tube or having the tube sloping upwardly with respect to the horizontal in the direction of movement of the articles. As is described in the aforementioned specification, preferably an induction coil is used and a susceptor block, for example a block of graphite, is arranged around said tube within the induction coil.

For controlling the temperature in the furnace, conveniently there is provided a second tube through said susceptor block with open ends, a radiation pyrometer being arranged for observing a test element within said second tube. This test element may be of any suitable material (e.g. recrystallised alumina) such that temperature variations may be observed by the pyrometer. The temperature of the test element need not be necessarily the same as the β-alumina ceramic article being sintered although preferably the furnace is arranged so that test element conditions are, as closely as possible, similar to those for the article being fired. However, variations of temperature of the test article will correspond to variations of temperature of the β-alumina ceramic material and hence the output of the pyrometer may be used for controlling the temperature of the furnace. Preferably an automatic control system is provided for this control of temperature.

In one convenient arrangement, the furnace tube through which the β-alumina ceramic articles are traversed and the tube containing the test article are symmetrically disposed on opposite sides of the axis of the induction heating coil. In such an arrangement, preferably the tube containing the β-alumina ceramic, referred to hereinafter as the firing tube, is continuously rotated to ensure uniform temperature condition and, for this purpose is arranged within a second stationary tube of slightly greater diameter extending through the susceptor block and furnace. With such a construction it has been found possible to control the sintering zone temperature readily to an accuracy ±5° C. Depending on the requirements, during operation the sintering zone may be maintained at any required temperature between say 1550° and 1900° C., typically at 1700° C.; each portion of the material to be fired may typically remain in the sintering zone for less than two minutes.

In applying the invention to making articles using a fast-firing technique, as described in the aforementioned British patent, the compressed powdered shapes may be moved at a uniform speed v through the furnace and the furnace may have a temperature profile increasing in temperature from one end up to a maximum sintering temperature between 1600° C and 1900° C and decreasing towards the other end, the length l of the sintering zone which is within 10° C of the maximum temperature in the furnace, and the velocity v at which the tube is moved through the furnace being such that the time 1/v during which any point in the material is in the sintering zone is between 12 seconds and 2 minutes, the temperature profile of the furnace and the rate of movement of the material being such that any point on the material is heated up to the sintering temperature and cooled from the sintering temperature at heating and cooling rates between 200° C per minute and 2400° C per minute.

DESCRIPTION OF THE PREFERRED EMBODIMENTS

Figure 1:
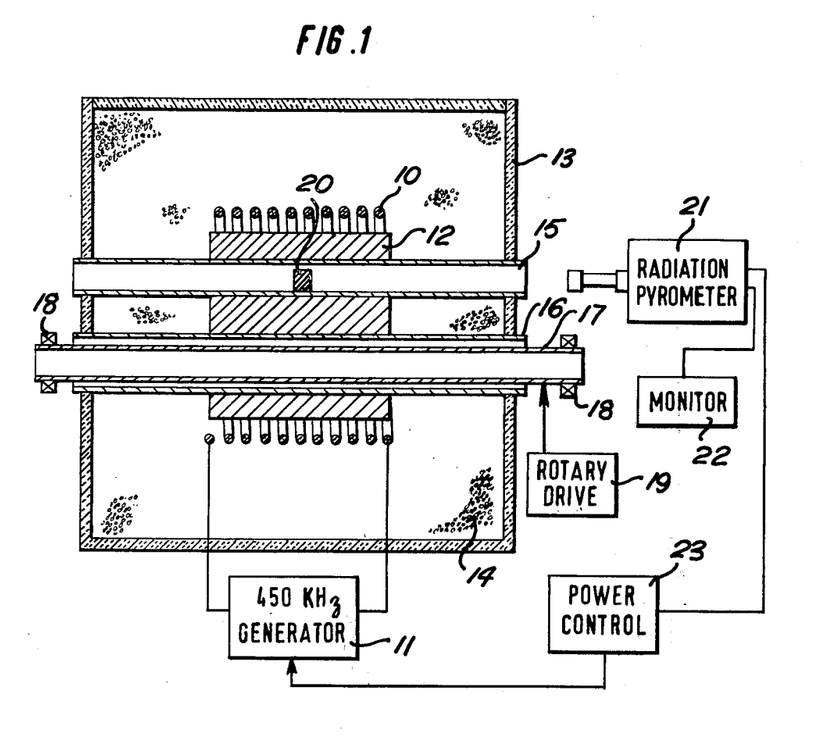
FIG. 1 is a diagrammatic section through one embodiment of an induction furnace for sintering β-alumina ceramic.

Referring to FIG. 1, there is shown a furnace for the sintering of β-alumina ceramic comprising an induction coil 10 energised from an alternating current generator 11 typically operating at 450 kHz. The coil 10 is a helical coil, typically only a few inches long and surrounding a graphite susceptor block 12. The coil 10 and susceptor block 12 are contained within an asbestos box forming a housing 13 which box is filled with bubbled alumina insulation, indicated diagrammatically at 14. Extending through the block 12 parallel to the axis of the coil 10 are two bores which are arranged symmetrically with respect to the axis of the coil. The first bore contains a refractory tube 15 which is open-ended and extends through the end walls of the asbestos box 13. The second bore through the susceptor block 12 is of larger diameter than the first bore and contains a fixed open-ended refractory tube 16 within which is a rotatable tube 17 of refractory material, e.g. alumina, for containing the article to be sintered. This tube 17 is carried in bearings 18 and continuously rotated by drive means indicated diagrammatically at 19 to equalise the temperature around the firing zone when the furnace is in operation. Typically rotation rates of 30 to 60 r.p.m. have been employed. The tube 15, when in use, contains a suitable refractory article indicated diagrammatically at 20, typically formed of recrystallised alumina, for observation by a total radiation pyrometer 21 for temperature control purposes. The output from the pyrometer 21 may be fed to a monitor 22 and/or to a power control unit 23 controlling the power output of the generator 11.

To preserve a stable soda-rich atmosphere, the rotating tube 17 should be impervious to the sodium oxide vapour. If the material of the rotating tube reacts with sodium oxide vapour, then the rate of this reaction should be so low that sodium oxide depletion does not occur. It was found, for example, that sodium oxide did react slowly with the recrystallised alumina tube used in the experiments referred to below, converting it into β-alumina. The reaction rate was quite low, the firing tube gaining 20 mg in weight for each 40 g tube which was fired. The loss from the articles being fired was less than 1% of the sodium oxide present. However the conversion of the firing tube to β-alumina is accompanied by a volume change so that this tube no longer remained impervious. For this reason only about 20 meters of tube could be fired before replacing the rotating tube 17; such replacement can be effected however without cooling the furnace.

A continuous air flow through the tube 17 of the furnace is obtained in operation by sloping the furnace upwardly in the direction of movement of the articles. Using convection in this way provides a very simple and reliable means of obtaining the required air flow; obviously however a forced air flow could be obtained in other ways without sloping the furnace.

In the following examples of the manufacture of β-alumina ceramic tubes, the quality of the sintered product is shown quantitatively by the density. The variations in density shown in these examples, although small in absolute terms, are of significance in considering the use of the material as an electrolyte. The examples given are for the purpose of explaining the invention and are therefore directed to showing the effect of changes in the air flow, including in particular the use of an air flow in the direction opposite to that called for by the method of the present invention. In these examples, a furnace as shown in the accompanying drawing was employed. In this furnace the rotating firing tube 17 had a bore of 19 mm, an outside diameter of 25.5 mm and was 500 mm long. The static firing tube 16 was 29 mm bore, 36 mm outside diameter and 375 mm long. The graphite susceptor block 12 was 100 mm long and gave a hot zone length of 120 mm at (T max - 100)° C. All the samples were tubular samples which were pre-dried before firing.

The first of the examples, set out as Example 1 below, relates to a furnace in which the slope was downwards in the direction of movement of the articles. Convection caused the air flow to be in the opposite sense to the direction of movement of the articles. This example is quoted to show the effect of such an arrangement which is contrary to the present invention. The water vapour was carried upwards and recondensed on the incoming material. The water concentration built up to a critical value and caused the incoming tubes to break up in the furnace.

The rotation of the firing tube 17 causes the samples being fired to rotate, by rolling on the surface of the firing tube 17, as they pass through the furnace. This rotation of the samples as they are fired assists in obtaining circularity of section and straightness of the final product.

EXAMPLE 1

The articles passed downhill through the furnace in a continuous run at a temperature of 1735° C. and traverse rate of 50 mm per minute. The onset of break-up due to excess water was so rapid that less than 400 mm of ceramic could be produced. The densities of 40 mm pieces, in the order they were fired, are given in the table and are plotted in FIG. 3.

Figure 3:
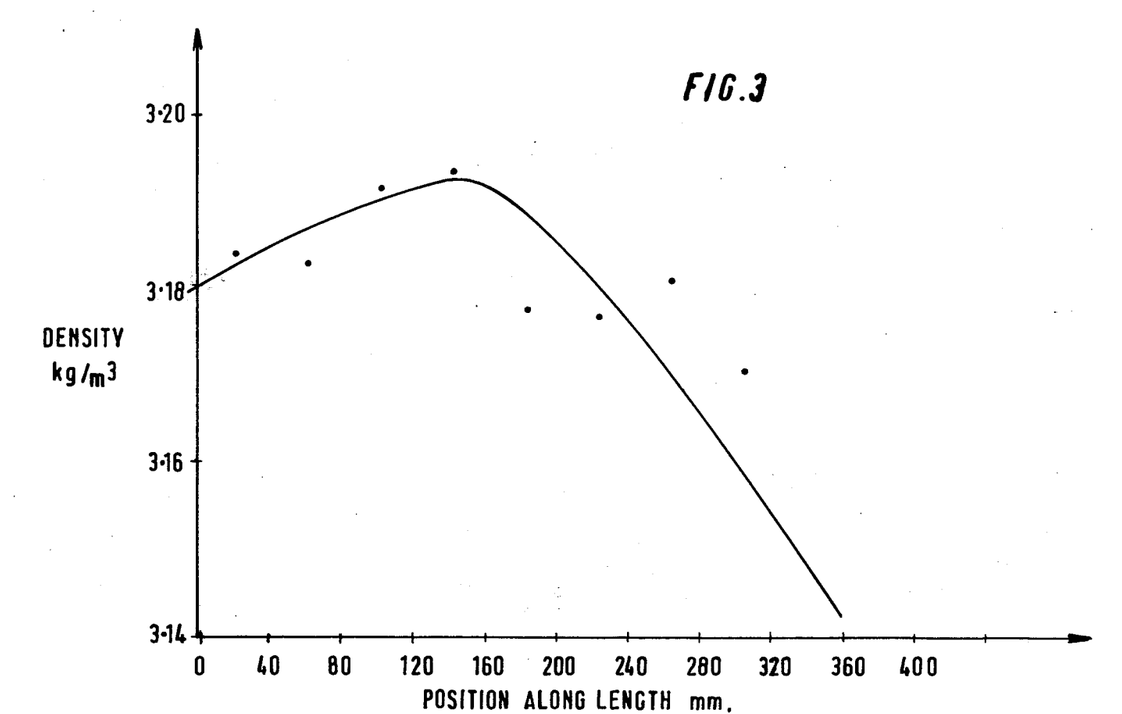

| Position (mm) | Density (Kg/m$^3$) |
| --- | --- |
| 0 – 40 | 3183 |
| 40 – 80 | 3182 |
| 80 – 120 | 3190 |
| 120 – 160 | 3192 |
| 160 – 200 | 3177 |
| 200 – 240 | 3176 |
| 240 – 280 | 3180 |
| 280 – 320 | 3170 |
| 320 – 370 | 3145 |

In Examples 2, 3 and 4 below, the furnace sloped uphill so that the water vapour and soda vapour were carried through the sintering zone to recondense on the fired tubes. Water vapour could not reach the critical condition on the unfired material and the soda gave a stable sodium oxide atmosphere in the firing zone. Continuous runs producing over 20 meters of ceramic have been made. The ceramic properties are uniform and are constant with time as shown in the following Examples 2, 3 and 4.

EXAMPLE 2

A continuous run uphill at a temperature of 1745° C. and traverse rate of 50 mm/minute. Firing tube inclined at 4° to the horizontal. 2000 mm of ceramic were produced and equilibrium became established after firing 100 mm of ceramic. Densities were then uniform throughout the remainder of the run. These firing conditions produce coarse grained ceramic.

| Tube No. | | Posn. in run (mm) | Density (Kg/m$^3$) |
| --- | --- | --- | --- |
| M8/1 | a | 0 – 51 | 3230 |
|  | b | 51 – 102 | 3239 |
|  | c | 102 – 153 | 3250 |
|  | d | 153 – 205 | 3255 |
| M8/3 | | 413 – 618 | 3249 |
| M8/4 | a | 618 – 669 | 3248 |
|  | b | 669 – 720 | 3244 |
|  | c | 720 – 771 | 3249 |
|  | d | 771 – 823 | 3250 |
| M8/5 | | 823 – 1030 | 3244 |
| M8/8 | | 1441 – 1648 | 3249 |
| M8/9 | | 1648 – 1848 | 3249 |

In the case of tubes M8/1 and M8/4, the letters a, b, c and d refer to the four samples taken from the respective tubes.

EXAMPLE 3

A sample from Example 2 was used to investigate uniformity through the wall thickness of a tube. This was achieved by measuring the density, successively grinding away the outside wall and remeasuring the density. The sample was uniform right up to the outside wall. Sample M8/4b (669 – 720 mm)

| Mass ($\times 10^3$Kg) | Density (Kg/m$^3$) |
| --- | --- |
| 6.642 | 3249 |
| 5.944 | 3252 |
| 5.264 | 3251 |
| 4.754 | 3253 |

EXAMPLE 4

Run M21 (tubes 21 to 39) was continuous and uphill. Four meters of ceramic were produced. The temperature was 1720° C. with a traverse speed of 50 mm/minute and the angle between firing tube and horizontal was 4°.

The mean density for the complete run was 3225 Kg/m$^3$, with a standard deviation of 6 Kg/m$^3$. These firing conditions produce fine grained ceramics.

| Tube No. | Posn. in run (mm) | Density (Kg/m$^3$) |
| --- | --- | --- |
| 21 | 0 – 205 | 3223 |
| 22 | 205 – 408 | 3224 |
| 23 | 408 – 618 | 3223 |
| 24 | 614 – 820 | 3214 |
| 25 | 820 – 1025 | 3222 |
| 26 | 1025 – 1231 | 3222 |
| 27 | 1231 – 1438 | 3222 |
| 28 | 1438 – 1645 | 3225 |
| 29 | 1645 – 1847 | 3239 |
| 30 | 1847 – 2053 | 3238 |
| 31 | 2053 – 2260 | 3221 |
| 32 | 2260 – 2466 | 3225 |
| 33 | 2466 – 2668 | 3228 |
| 34 | 2668 – 2875 | 3221 |
| 35 | 2875 – 3079 | 3225 |
| 36 | 3079 – 3284 | 3224 |
| 37 | 3284 – 3490 | 3223 |
| 39 | 3695 – 3901 | 3230 |

Figure 2:
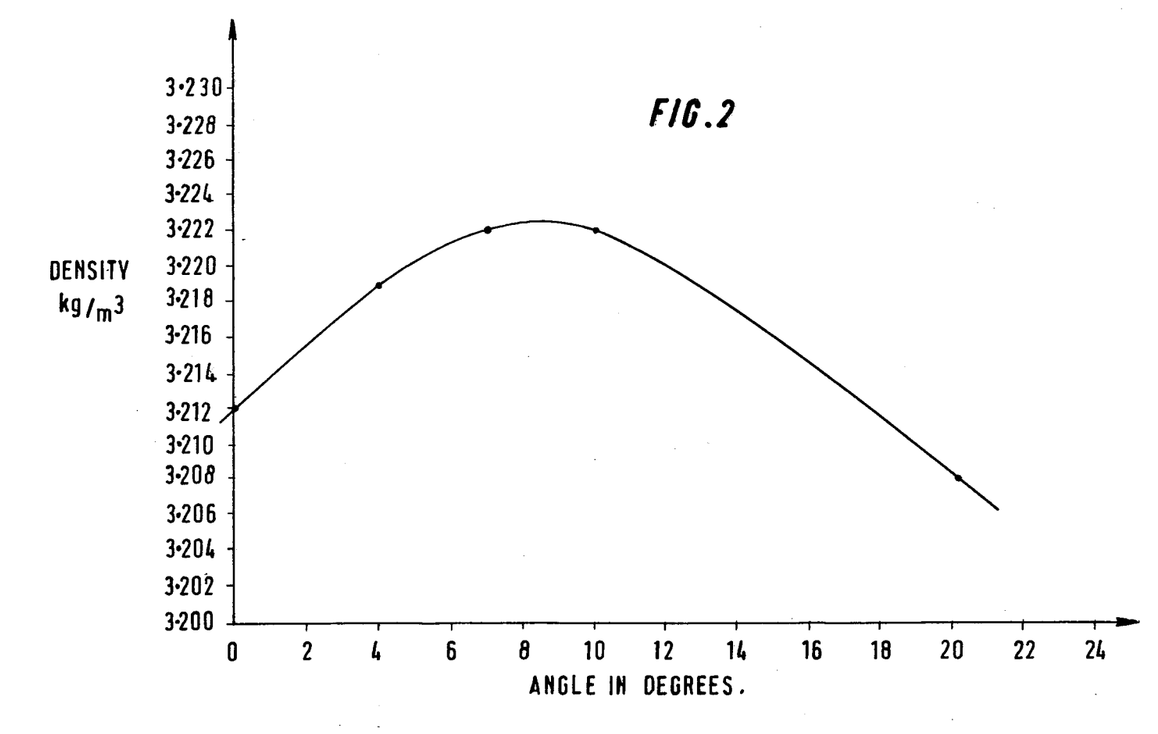
FIGS. 2 and 3 are graphical diagrams illustrating the relation between density of material and angle of slope of the furnace for one set of experiments and showing the improved results obtained when using an uphill slope (as in FIG. 2) compared with a downhill slope (as in FIG. 3)

Examples 2, 3 and 4 illustrate how correct atmosphere control may be achieved by natural convection. For a given furnace geometry, the convection currents depend on the angle of inclination of the firing tube and ceramic properties will also be sensitive to this angle. This is demonstrated in FIG. 2 which is a graphical diagram showing the relationship between density and angle of slope to the horizontal for an upward sloping arrangement. The firing temperature was 1720° C with a traverse speed of 50 mm/minute. The graph shows that, as the angle is varied, the density exhibits a flat topped maximum. The slope has to be sufficiently great that the convective gas flow carries the water vapour upwardly through the tube. It should not be so great however that the sodium oxide is carried away from the firing zone too fast preventing the establishment of the stable soda-rich atmosphere.

The advantage of continuous firing providing a stable atmosphere and improving ceramic properties can be seen by reference to Example 5 below. Two sets of tubes were fired under similar conditions except that one set were continuously and the other intermittently fired. A marked increase in the absolute value of the density resulted.

EXAMPLE 5

In run 29 a number of tubes were fired at 1745° C at a traverse rate of 50 mm per minute. However they were fired intermittently. Single tubes were pushed through the furnace using a long thin push rod (3.2 mm outside diameter rod or tube), and the orientation of the furnace was horizontal. The density of samples 14, 15 and 18 are recorded below:

| Sample | Density |
|--------|---------|
| 29/14  | 3195    |
| 29/15  | 3208    |
| 29/18  | 3193    |

The densities are significantly less than those obtained in Example 2 when the speed and temperature were the same, but the samples were passed continuously uphill through a tube inclined at an angle of 4° to the horizontal.

From these examples, when relying on natural convection to zone sinter $\beta$-alumina ceramic electrolyte, the material must be moved uphill through a furnace tube inclined at an angle greater than 0° to the horizontal, but preferably between 4° and 10°. Material sintered under these conditions in uniform both throughout the bulk and as a function of time. It will be understood that the preferred angle found in this way is related to the particular furnace and shapes being processed. The convection airflow will depend, for example, on the relative cross-sectional areas of the article and furnace tube. For any given conditions the optimum slope may readily be found empirically.

Although reference has been made more particularly to the production of tubes of $\beta$-alumina ceramic, the method and apparatus are equally applicable to the production of discs which can be passed through the furnace in succession so, in effect, forming a rod.

Figure 4:
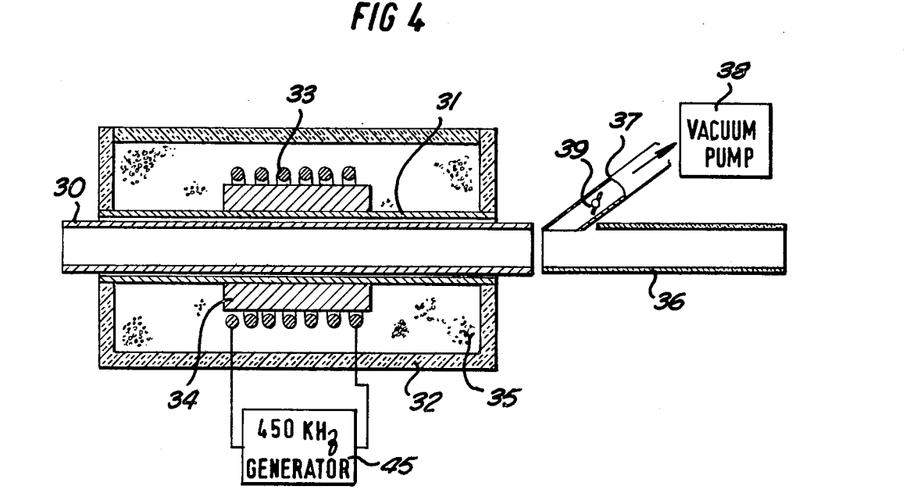
FIGS. 4 and 5 illustrate diagrammatically further embodiments of induction furnaces for sintering β-alumina.
Figure 5:
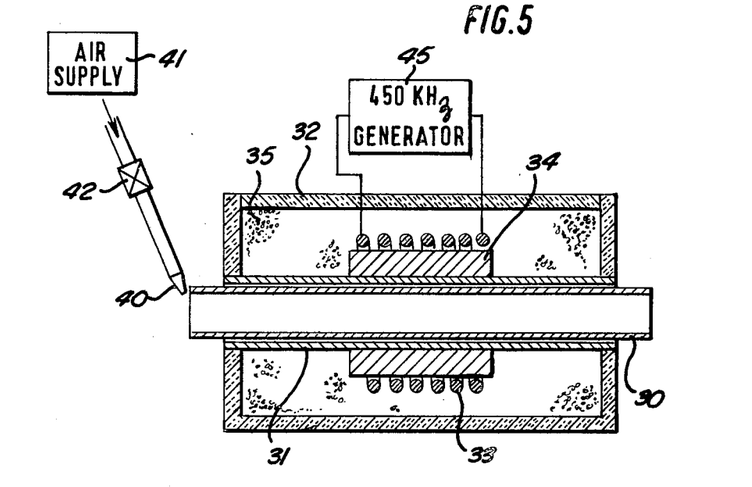

The use of a sloping furnace tube giving convective flow of air through the furnace is a particularly convenient was of obtaining the required air flow. This flow however can be obtained in other ways and FIGS. 4 and 5 illustrate two constructions of furnace with forced flow. In these two figures, for simplicity, temperature measuring and control arrangements, such as have been shown in FIG. 1, have been omitted but these may be provided in the same way as in FIG. 1.

Referring to FIG. 4, there is shown a rotatable tube 30, similar to the tube 17 of FIG. 1, within a stationary furnace tube 31 which is mounted in an asbestos box 32 containing an induction coil 33 on a graphite susceptor block 34. The box 32 contains bubbled alumina insulation 35. In this example, the coil 33 is energised by a 450 kHz generator 45. The furnace conditions and operation are as described with reference to FIG. 1. At the outlet end of the rotatable tube 30 is a stationary glass tube 36 through which the fired ceramic article passes. A tube 37 connected to a vacuum pump 38; a butterfly valve 39 in tube 37 enables the flow to be regulated.

FIG. 5 illustrates a modification of the arrangement of FIG. 4 in which, instead of having a vacuum pump extracting air through the furnace tube, a nozzle 40 connected to a compressed air or oxygen supply 41 via a regulator 42 is provided to inject an oxygen-containing gas into the inlet end of the furnace tube 30.

The required gas flow rate through the furnace must be greater than the speed of movement of the article but is quite low. In practice the flow rate would be determined empirically. Actual measurement of the air speed is difficult but, at room temperature, in practice it would be less than 3 m/sec and usually less than 1 m/sec.

In the following Examples 6, 7, 8, 9 and 10 a horizontal furnace was used. In Example 6, which is for comparison, no forced flow was employed. Example 7 is an example of a reverse flow, that is flow in the opposite direction to that called for by the present invention. Example 8 is an example of forward flow. Example 9 is an example of forward flow in which the articles are formed of compressed powdered $\beta$-alumina instead of a compressed powdered mixture of materials which together form $\beta$-alumina on sintering. Example 10 is an example using a forward flow of oxygen-enriched air.

In Examples 6 to 10 the tubes, which were 210 mm long and 26 mm diameter, were fired by passing them through the furnace sequentially and in contact in the order shown in the tables.

EXAMPLE 6

In this example, the tubes to be fired were formed of pre-dried compressed powdered material of composition 2% MgO, 7.65% $Na_2O$ balance $Al_2O_3$ made up as $NaAlO_2$, MgO and $Al_2O_3$, the percentages being by weight. The furnace was horizontal. The articles were moved through the furnace at 60 mm/min. The firing temperature was 1705° C.

| Tube    | Density (Kg/m³) | Visible Defects |
|---------|-----------------|-----------------|
| 27-26 -1 | 3236           | open and closed ends cracked |
| -2      | 3239            | none |
| -3      | 3242            | open end cracked |
| -4      | 3241            | none |
| -5      | 3233            | " |
| -6      | 3233            | " |
| mean density 3237 | | |
| 27-26 -64 | 3240          | None |
| -65     | 3241            | " |
| -66     | 3247            | " |
| -67     | 3248            | " |
| -68     | 3250            | " |
| -69     | 3249            | " |
| -70     | 3246            | open end cracked - tubes oval |
| -71     | 3239            | " |
| -72     | 3227            | " |
| -73     | 3240            | " |
| -74     | 3232            | " |
| -75     | 3239            | " |
| mean density 3242 | | |

Three sintered $\beta$-alumina spacers 80 mm long were passed through the furnace before each group of tubes. The densities of the tubes were slightly lower than in the sloping furnace and the incidence of defects became greater as the firing proceeded.

EXAMPLE 7

The material, speed of movement through the furnace and conditions were the same as in Example 6 except that the measured temperature was 1706° C and that a reverse air flow was employed. The air flow rate was measured as 1.8 m/s using a thermistor air flow meter with the furnace empty of tubes. It was not possible to make reliable measurements of flow rate with tubes in the furnace but the flow rate was diminished by a factor of approximately 10.

| Tube | Density (Kg/m$^3$) | Visible Defects |
| --- | --- | --- |
| 27-26-84 | 3246 | None |
| -85 | 3244 | " |
| -86 | 3239 | " |
| -87 | 3235 | Slightly oval and bent |
| -88 | 3233 | Oval and bent |
| -89 | 3214 | Oval and bent |
| -90 | 3212 | Oval, bent, collapsed closed end |
| mean density 3232 | | |

Note the trend towards lower densities as more tubes were fired under these conditions and the associated increase in the incidence and severity of defects.

EXAMPLE 8

The material, speed of movement through the furnace and conditions were identical with Example 6 but a forward air flow was induced. This flow was measured as in Example 7 in the furnace empty of tubes.

| Tube | Density (Kg/m$^3$) | Flow Rate (m/s) | Visible Defects |
| --- | --- | --- | --- |
| 27-26-7 | 3241 | 0.3 | Open-end crack |
| -8 | 3242 | " | None |
| -9 | 3243 | " | " |
| -10 | 3242 | " | " |
| -11 | 3250 | " | " |
| -12 | 3246 | " | " |
| -13 | 3242 | " | " |
| -14 | 3244 | " | " |
| -15 | 3239 | " | Open-end crack |
| -16 | 3245 | " | None |
| -17 | 3245 | " | " |
| mean density 3244 | | | |
| -18 | 3241 | 0.6 | None |
| -19 | 3245 | " | " |
| -20 | 3248 | " | " |
| -25 | 3247 | " | " |
| -26 | 3244 | " | " |
| -27 | 3248 | " | " |
| -28 | 3250 | " | " |
| -29 | 3242 | " | " |
| "30 | 3249 | " | " |
| -31 | 3251 | " | " |
| "32 | 3245 | " | " |
| -36 | 3242 | " | " |
| -37 | 3242 | " | " |
| -38 | 3244 | " | " |
| -39 | 3247 | " | " |
| -40 | 3245 | " | " |
| mean density 3246 | | | |
| 27-26-41 | 3244 | 1.3 | None |
| -42 | 3246 | " | " |
| -43 | 3249 | " | " |
| -44 | 3247 | " | " |
| mean density 3247 | | | |
| 27-26-45 | 3250 | 2.0 | None |
| -46 | 3242 | " | " |
| -47 | 3243 | " | " |
| -48 | 3244 | " | " |
| mean density 3245 | | | |
| 27-26-76 | 3241 | 3.5 | None |
| -77 | 3245 | " | " |
| -82 | 3241 | " | " |
| -83 | 3241 | " | " |
| mean density 3242 | | | |

The overall mean density was 3245 Kg/m$^3$. Under these conditions the conditions of gas flow in the furnace became equivalent to those produced by convection in a sloping furnace as previously described and the tubes all have high fired densities, they are substantially free of defects and have been sintered uniformly.

EXAMPLE 9

In this example, the tubes to be fired were passed through a horizontal furnace with a forward air flow as in Example 8. The firing temperature was 1705° C and the speed of movement, as before, was 60 mm/min. The measured forward air flow rate with the furnace empty was 0.6 m/s.

Green shapes were isostatically passed from powdered material of the same composition as Examples 6, 7, 8 and 9 but they were then converted to $\beta$-alumina by heat treatment at 1300° C for 10 h before sintering. The conversion to $\beta$-alumina was confirmed by X-ray diffraction analysis. No sintering took place at this temperature which is substantiated by studies of the zone-sintering process in which conversion of the constituent powders to $\beta$-alumina is found to be complete before sintering takes place.

| Tube | Density (Kg/m$^3$) | Visible Defects |
| --- | --- | --- |
| 27-26-52 | 3201 | None |
| -53 | 3197 | " |
| -54 | 3208 | " |
| -55 | 3208 | " |
| -56 | 3219 | " |
| -57 | 3209 | " |
| mean density 3207 | | |

The reactivity of the powder may be diminished by the heat treatment; improved densities might be obtained by using a more reactive $\beta$-alumina powder or by changing the sintering conditions. The mean density is nonetheless 98% of the theoretical density of $\beta$-alumina.

EXAMPLE 10

With a horizontal furnace, oxygen was fed into the furnace at 0.025 m/s with flow induced at 0.6 m/s. (furnace empty of tubes). The furnace atmosphere would be as described previously but enriched to approximately 50% oxygen. The firing temperature was 1705° C and speed of movement 60 mm/min. The material was the same as in Examples 6, 7 and 8.

| Tube | Density (Kg/m$^3$) | Visible Defects |
| --- | --- | --- |
| 27-26-58 | 3250 | None |
| -59 | 3246 | " |
| -60 | 3251 | " |
| -61 | 3246 | " |
| -62 | 3246 | " |
| -63 | 3251 | " |
| mean density 3248 | | |

Oxygen enrichment apparently has no effect, either deleterious or beneficial, on the properties of the tubes.

The above described Examples 6 to 10 show the improvements obtained by using a forced flow in the forward direction. The rate of flow must be higher than the rate of movement of the articles being fired through the furnace. Suitable rates of flow are readily determined empirically. Although measurement of the rates of flow is difficult, this is unnecessary in practice since suitable rates can readily be determined experimentally. The examples of convective flow using a sloping furnace illustrate that improvement is obtained over a wide range of flow rates. The gas employed is most conveniently air although any oxygen-containing gas could be used.

We claim:

1. A furnace for the production of β-alumina ceramic articles comprising an open-ended tube with heating means for heating the tube and means for moving the articles continuously through the tube at a uniform rate and having means for inducing oxygen-containing gas to flow through the tube in the direction of movement of the articles.

2. A furnace as claimed in claim 1 wherein the tube is sloped upwardly with respect to the horizontal in the direction of movement of the articles to induce convective air flow through the tube.

3. A furnace as claimed in claim 2 wherein the tube is sloped upwardly at an angle of 4 to 10° to the horizontal.

4. A furnace as claimed in claim 1 wherein said heating means comprise an induction coil around the tube.

5. A furnace as claimed in claim 4 wherein a susceptor block is arranged around said tube within the induction coil.

6. A furnace as claimed in claim 5 wherein said susceptor block is a block of graphite.

7. A furnace for the production of β-alumina ceramic articles comprising an open-ended tube, a susceptor block having a bore through which said open-ended tube passes, an induction coil around said susceptor block, a second tube through said susceptor block, means for moving the ceramic articles continuously through said open-ended tube at a uniform rate, means for inducing oxygen-containing gas to flow through said open-ended tube in the direction of movement of the articles, and a radiation pyrometer for observing a test element within said second tube.

8. A furnace as claimed in claim 7 wherein automatic control means are provided responsive to said radiation pyrometer and arranged to control the power supply to said furnace.

9. A furnace as claimed in claim 7 wherein the tube through which the β-alumina articles are traversed and the tube containing the test element are symmetrically disposed on opposite sides of the axis of the induction heating coil.

10. A furnace as claimed in claim 7 wherein said second tube through said susceptor block has open ends.

11. A furnace for the production of β-alumina ceramic articles comprising a susceptor block, an open-ended tube extending through said susceptor block, an induction coil around said susceptor block, means for rotating said open-ended tube about its axis, means for moving the ceramic articles continuously through said open-ended tube at a uniform rate, means for inducing oxygen-containing gas to flow through said open-ended tube in the direction of movement of the articles, a second tube extending into said susceptor block, and means responsive to the temperature of a test element in said second tube.

12. A furnace as claimed in claim 11 wherein the tube containing the β-alumina ceramic articles is continuously rotated and is arranged within a second stationary tube of slightly greater diameter extending through the susceptor block and furnace.

13. A furnace as claimed in claim 11 wherein said means responsive to the temperature of a test element in said second tube is a radiation pyrometer.

14. A furnace for the production of β-alumina ceramic articles comprising an open-ended tube with heating means for heating the tube and means for moving the articles continuously through the tube at a uniform rate and having means for forcing an oxygen-containing gas to flow through the tube in the direction of movement of the articles.

15. A furnace as claimed in claim 14 and further comprising means for rotating said tube about its axis.

* * * * *